Patented Nov. 21, 1944

2,363,325

UNITED STATES PATENT OFFICE 2,363,325

TREATMENT OF PLANTS

Albert E. Hitchcock and Percy W. Zimmerman, Yonkers, N. Y., assignors to Boyce Thompson Institute for Plant Research, Inc., a corporation of New York No Drawing. Application July 14, 1943,
Serial No. 494,704

7 Claims. (Cl. 47—58)

This invention relates to the treatment of plants with plant hormones and has for its object the provision of an improved method for treating leafy shoot buds and flower buds to control their normal development. More particularly, the invention provides a method for treating the buds before they go into dormancy to regulate and particularly to delay the growth of leafy shoot buds, or to delay the normal flowering time of flower buds, in the subsequent growing and flowering season. The treatment survives through the period of dormancy and is manifested in the subsequent growing season by an appreciable delay in the growth or in the flowering time.

This invention is based upon our discovery that certain plant hormones brought into contact, preferably direct, with the buds, or with the contiguous plant tissue, before the buds actually go into dormancy, for example, in the summer and early autumn, will induce a control of development that will carry through the period of dormancy, for example, through the winter, and delay the growth or the flowering of the buds in the following growing season, usually in spring. We have found that many species of fruit trees and flowering ornamental plants may be treated with the required concentrations of plant hormones during July, August or September, for example, and that the effect survives the period of dormancy and manifests its control of development in the following spring. The normal flowering of fruit bearing plants or ornamental shrubs may be delayed for from a few days to several weeks to lessen the damage of early frost. Particular plants of a group, or parts of a single plant, may be treated to delay flowering to give a longer total flowering period for the group of treated and untreated plants, or the partly treated plant.

It is becoming increasingly more desirable or necessary to transplant woody plants such as trees and shrubs in the late spring and early summer and the invention aims to treat such woody plants during the previous summer or early fall, usually prior to dormancy, with a plant hormone to delay the normal spring bud growth.

In our copending application Serial No. 280,806, filed June 23, 1939, we describe a method of treating buds directly with plant hormones to delay or retard their development in which the buds on flowering trees are treated during the spring a short time prior to normal flowering. We have now made the wholly unexpected discovery that the leafy shoot buds, flower buds and contiguous branches of plants may be treated during the summer, or when the buds have not gone into dormancy, with plant hormones, even those that are very soluble in water, with the result that the hormones, or the residual effect thereof, will survive the rains and ravages of winter and carry over to the next growing season, usually the next spring. The results are more consistent and exhibit a more striking influence of the hormone effect than the results obtained in using similar bud-inhibiting hormones in the spring when the buds are out of their rest period and ready to grow.

Any suitable plant hormone having the specific physiological capacity to delay, retard or inhibit bud growth or flowering may be used, and the hormone may be applied to the bud or contiguous structures in the form of liquid sprays, emulsions, pastes, dispersions, dusts or vapors, and in the concentrations necessary to give the desired control of development. The hormones may, for example, be applied at the same time and when admixed with other materials applied to the plants to combat diseases or insects. We have found a large number of aryl compounds having plant hormone activity to be suitable for the invention, among which may be mentioned:

Alpha-naphthaleneacetic acid, its salts, esters, and amides;

Beta-naphthoxyacetic acid, its salts, esters, amides and the higher homolog known as beta-naphthoxy-alpha-propionic acid with its salts, esters and amides;

Substituted phenoxy compounds such as 2,4-dichlorophenoxyacetic acid, 3,4,5-trichlorophenoxyacetic acid, their amides, esters, salts, and their higher homologs such as 2,4-dichlorophenoxy-alpha-propionic acid, 3,4,5-trichlorophenoxy-alpha-propionic acid and their salts, esters and amides;

Ortho-chlorophenoxyacetic acid, the higher homologs propionic and butyric acids, their salts, esters and amides. Other halogens may be substituted for the chlorine of these compounds.

The time of the year at which the hormone is applied determines to some extent the concentration which may be used. Early summer treatments usually involve low concentrations. When the hormone is applied as an aqueous spray, for example, 50 milligrams of the hormone per liter of water are effective for early summer treatment. Late treatment as, for example, in September, may require 200 or more milligrams per liter of water. The optimum time for treatment, which for many types of plants is around August, may require around 100 milligrams of the hormone per liter of water. When many plant species are considered and all times of the summer and fall, the concentration range of hormone may extend from 10 milligrams per liter to 1,000 milligrams per liter when alpha-naphthaleneacetic acid or its derivatives are used. Though the spray is effective when dissolved in water and applied to the plants, its activity is increased by the use of an effective spreader. Spreaders commonly used in insecticides are satisfactory, such as the material sold under the trade-name of Aerosol OT, a product marketed by the American Cyanamid & Chemical Corporation.

The hormone sprays can be applied to individual branches of a shrub or a tree, the method varying with the results one hopes to accomplish. If the flowering is to be staggered over a long period for an ornamental effect, one may treat only a portion of the shrub or tree, or treat the plant at different times during the season, thus bringing about growth and flowering of different parts of the same shrub at different times. If one wishes to stagger the fruit over a long season as would be desirable for mangos, avocados, etc., grown in tropical and subtropical climates, it would be desirable to treat only a portion of the tree at a time. It now appears that mangos have one flush season and then the tree is free of fruit until another season arrives. The invention, accordingly, enables one to stagger the flowering and fruiting either on different trees or on portions of the same tree. The method of the invention involves regulation of growth during the formative stage of the bud as well as the time for flowering after the bud goes through its resting period.

The following examples of treatment are illustrative of particular adaptations of the method of the invention:

On September 13, aqueous sprays containing potassium alpha-naphthaleneacetate (KNA) in concentrations of 100, 320, and 1000 mg./l. were applied to branches of apple, cherry, peach, pear, and plum trees located in New York. These same sprays were also applied to McIntosh apple trees on September 16. In the following spring, it was observed that branches receiving the highest concentration of KNA were noticeably delayed in the opening of flower and vegetative buds. The degree of retardation varied according to the concentration of KNA and the variety of fruit. Similar treatments were applied to fruit trees in which KNA was used in concentrations of 200, 400, 800, and 1000 mg./l. with 0.1 per cent Aerosol OT as a spreader. The sprays were applied on July 21, August 20, and September 17. Results of these tests not only confirmed those of the previous year, but in addition, showed that the degree of delay in bud opening also was influenced by the time of applying the spray.

The concentrations of KNA mentioned above were applied as a single application to two or more branches of the following varieties of fruit trees: Apple (Stayman Winesap, McIntosh, Baldwin, Rhode Island Greening, Grimes Golden), cherry (Montmorency, Black Tartarian, Windsor), peach (Carmen, Elberta, Mountain Rose), pear (Bartlett, Seckel), and plum (Burbank, Abundance). A 1000 mg./l. spray was applied only on September 17. Other concentrations of 200, 400, and 800 mg./l. were applied with a sprayer on July 21, August 20, and September 17. Apple and cherry received a more complete series of treatments and more replications than the other kinds of fruit trees.

One the following April 14, an examination of the treated branches in the orchard revealed that certain treatments had delayed the development or growth of flower and vegetative buds on all varieties of fruit trees. The degree of inhibition varied according to the concentration of KNA, the time the spray was applied, and the variety of fruit tree. Between the 20th and 24th of April, it became apparent that the vegetative buds were generally delayed to a greater extent than the flower buds. The difference was most pronounced for buds receiving the 400 and 800 mg./l. sprays in July. This preferential effect on flower and vegetative buds became less marked with later applications or with the lower concentrations at any given time.

A description of the results for Montmorency cherry can be considered as representative of the results as a whole for the other kinds of fruit trees. Sprays applied in July had the greatest retarding effect and those applied in September had the least effect. A 200 mg./l. spray was about as effective when applied in July as a 400 mg./l. spray in August, or an 800 mg./l. spray in September. Of the treatments applied in September the 800 mg./l. spray was the only one which was noticeably effective. In contrast, the lowest concentration used in July (200 mg./l.) was not low enough to be considered as the minimum effective dose for Montmorency cherry.

Flower buds located on spurs were generally delayed to a greater extent than those on one-year-old shoots. The opening of flower buds was delayed from a few days to 14 days depending upon the concentration and time of applying the spray. Vegetative buds were delayed similarly up to 19 days. Terminal vegetative buds were retarded to a lesser extent than side buds. The treatments which caused the greatest delay in opening of flower buds brought about a condition whereby at the time of flowering there were few or no leaves. The relative amount of leaf surface on control and treated branches at the time of full bloom varied considerably with different varieties of cherry and other kinds of fruits.

The greater the dosage, the fewer the number of flower buds which opened. In the spring, treated flower buds which were smaller than control buds were generally the latest to open. When these smaller buds opened, the flowers were similar in appearance to the controls except in the case of buds receiving the July application of 800 mg./l. In the latter case, at least some of the flowers appeared to be of slightly smaller diameter or had shorter peduncles than the controls. The smaller size of some of the treated buds was observed in November as well as in early spring.

Fruit set on treated branches was delayed slightly and appeared to be spread over a longer period as compared with the controls. The development of the fruit on treated branches appeared to proceed at a normal rate, but due to the initial delay in fruit set there was a greater range in size of green fruits on treated branches than on the controls. Ripe fruit had the same general appearance on treated and control branches.

The results thus far described apply not only to Montmorency cherry but also to the varieties Black Tartarian and Windsor. In contrast, the apple was slightly more resistant and the peach and plum more sensitive than the cherry. Thus the optimum treatment varied with the kind of fruit.

In other tests the opening of flower buds on potted lilac plants was delayed 10 to 14 days by naphthaleneacetic acid applied in the form of an aqueous spray. Treatments with the methyl and ethyl esters of alpha-naphthaleneacetic acid, which induced parthenocarpic development of fruit on *Ilex opaca*, also delayed the opening of buds for one year, even though these plants were subjected later to the usual low temperature period.

The application of the plant hormones as sprays may be by means of mechanical sprayers similar to those now used for applying insecticides as aqueous sprays or dusts, and the vapor may be applied by vaporizing the hormones in growing enclosures or in covers such as tents suspended over the plants. The hormones applied as dusts may be admixed with dust carriers or diluents, or materials in which the hormone is absorbed. The vapor may result from the slow vaporization of the hormone from the liquid, carrier or absorbent with which it is held in contact with the plant.

In the specification and claims we have used the expression "control their development" as a generic expression covering the effect resulting in the delay of flowering of flower buds and the effect resulting in the delay in the growth of leafy shoot buds.

We claim:

1. The improved method of treating plant buds to control their development which comprises applying to the plant while the buds are being formed a plant hormone of such character and in such concentration that the effect of the hormone on the bud development is manifested during the growing season following dormancy by a delay of from a few days to about three weeks.

2. The improved method of treating plant buds to control their development which comprises applying to the plant before the buds go into dormancy a plant hormone of such character and in such concentration that the effect of the hormone on the bud development is manifested during the growing season following dormancy by a delay of from a few days to about three weeks.

3. The improved method of treating plant buds to control their development which comprises applying to the plant buds before the buds go into dormancy a plant hormone of such character and concentration that the effect of the hormone on the bud development is manifested during the spring following dormancy by a delay of from a few days to about three weeks.

4. The improved method of treating plant buds to control their development which comprises applying to the plant buds in the period during summer and extending into early autumn a plant hormone of such character and in such concentration that the effect of the hormone in controlling the development is manifested during the growing season following dormancy by a delay of from a few days to about three weeks.

5. The improved method of treating the flowering buds of a fruit bearing perennial plant having a dormant period which comprises treating the buds before dormancy with a plant hormone having the specific physiological effect of delaying the bud flowering following the period of dormancy.

6. The improved method of treating the leafy buds of perennial plants having a dormant period which comprises treating the buds before dormancy with a plant hormone having the specific physiological effect of delaying the growth of the buds following the period of dormancy.

7. The improved method of treating the flowering buds of a fruit bearing perennial tree growing outside and exposed to the weather which comprises applying to the tree buds in the period during summer and extending into early autumn a plant hormone of such character and in such concentration that the bud development during the following spring is delayed for a time varying from a few days to about three weeks.

ALBERT E. HITCHCOCK.
PERCY W. ZIMMERMAN.